(12) United States Patent
Lee

(10) Patent No.: US 7,890,721 B2
(45) Date of Patent: Feb. 15, 2011

(54) IMPLEMENTATION OF INTEGRATED STATUS OF A PROTECTION REGISTER WORD IN A PROTECTION REGISTER ARRAY

(75) Inventor: Jung Y. Lee, Campbell, CA (US)

(73) Assignee: Atmel Corporation, San Jose, CA (US)

( * ) Notice: Subject to any disclaimer, the term of this patent is extended or adjusted under 35 U.S.C. 154(b) by 428 days.

(21) Appl. No.: 11/059,111

(22) Filed: Feb. 16, 2005

(65) Prior Publication Data

US 2006/0184751 A1   Aug. 17, 2006

(51) Int. Cl.
*G06F 12/08* (2006.01)
(52) U.S. Cl. .................... 711/163; 711/151; 711/152; 710/28; 710/36; 710/200; 714/763
(58) Field of Classification Search ............... 711/151, 711/152, 163; 710/28, 26, 200; 714/763
See application file for complete search history.

(56) References Cited

U.S. PATENT DOCUMENTS

| | | | |
|---|---|---|---|
| 5,771,348 A | 6/1998 | Kubatzki et al. ............ 395/186 |
| 5,873,112 A * | 2/1999 | Norman ...................... 711/103 |
| 6,034,889 A | 3/2000 | Mani et al. ............. 365/185.04 |
| 6,256,715 B1 | 7/2001 | Hansen ....................... 711/163 |
| 6,349,057 B2 | 2/2002 | Hotaka ................... 365/185.04 |
| 6,778,443 B2 | 8/2004 | Shiga et al. ............ 365/185.33 |
| 2004/0083346 A1 | 4/2004 | Chevallier et al. ........... 711/163 |
| 2004/0141379 A1 | 7/2004 | La Malfa et al. ....... 365/185.33 |
| 2004/0151026 A1 | 8/2004 | Naso et al. ............. 365/185.04 |
| 2004/0205314 A1 | 10/2004 | Babudri et al. .............. 711/163 |
| 2005/0024954 A1 * | 2/2005 | Dalvi et al. .................. 365/199 |
| 2006/0155947 A1 * | 7/2006 | DeCaro ....................... 711/163 |

OTHER PUBLICATIONS

Atmel Publication, AT49SN12804, AT49SV12804, "128-megabit (8M x16) Burst/Page Mode 1.8 volt Flash Memory", Rev. 3314A-Flash, Apr. 2004, 41 pages.

* cited by examiner

*Primary Examiner*—Sanjiv Shah
*Assistant Examiner*—Midys Rojas
(74) *Attorney, Agent, or Firm*—Schwegman, Lundberg & Woessner, P.A.

(57) ABSTRACT

A protection register array in which the lock status of the protection register is stored outside of the array. An initial verify function is used to read lock status.

15 Claims, 2 Drawing Sheets

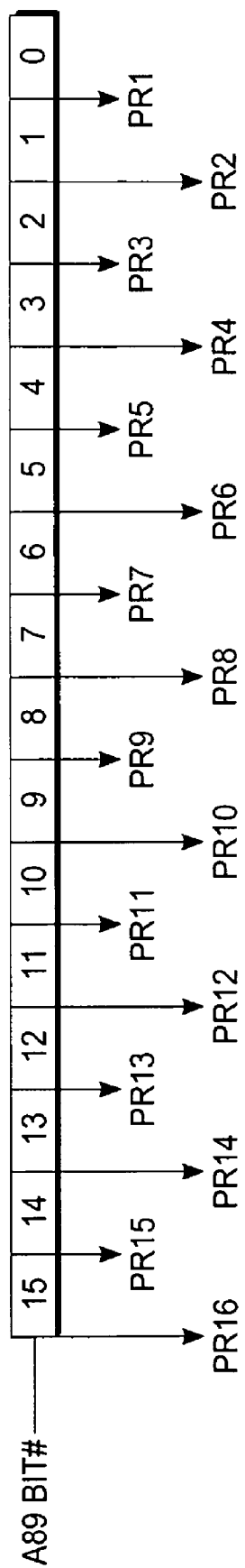
Fig._1

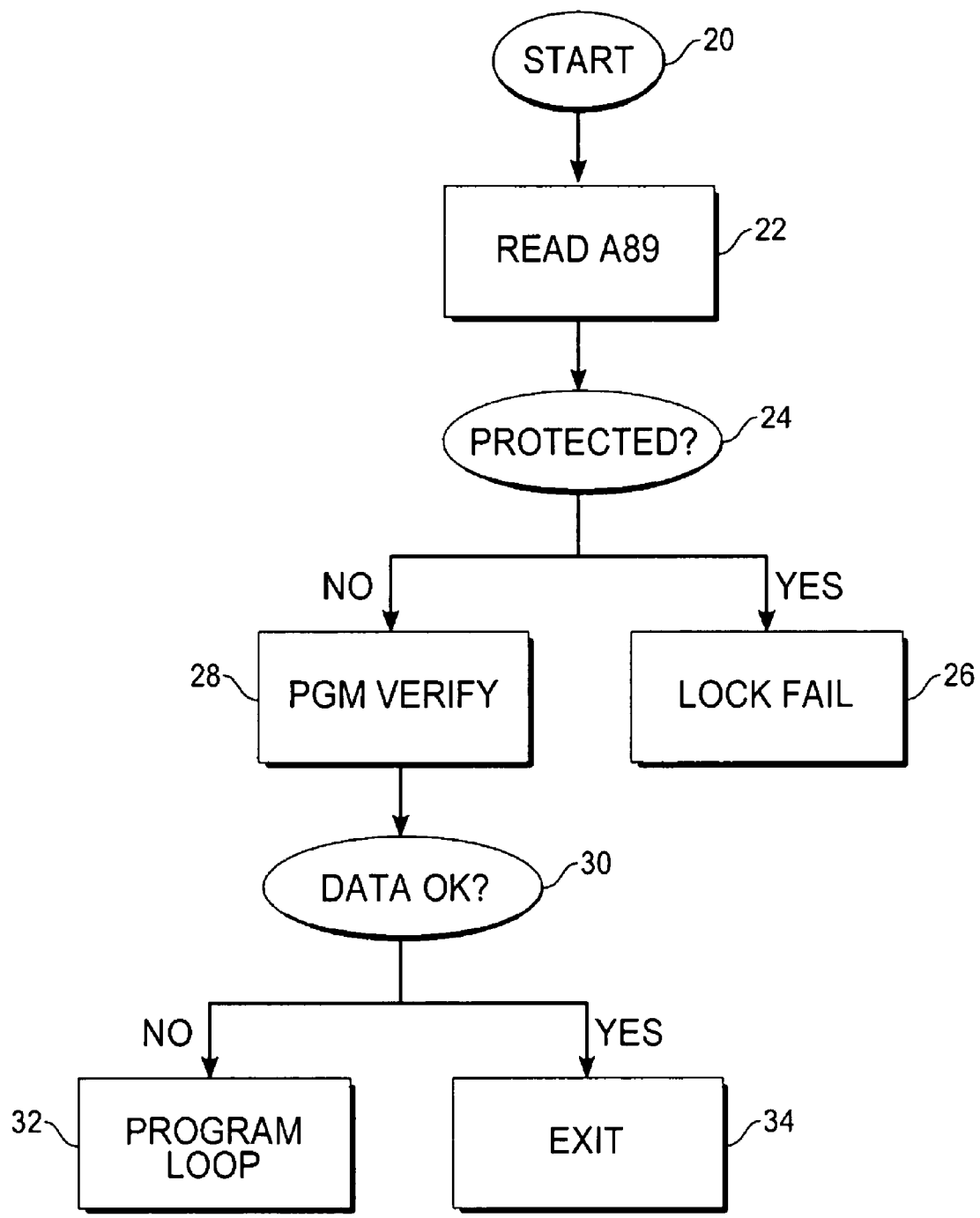
Fig._2

IMPLEMENTATION OF INTEGRATED STATUS OF A PROTECTION REGISTER WORD IN A PROTECTION REGISTER ARRAY

TECHNICAL FIELD

This invention relates generally to integrated circuits and more specifically to protection registers for integrated circuits.

BACKGROUND OF THE INVENTION

Memory devices are commonly included as internal data storage devices in a computer. One very common type of memory is random access memory (RAM). RAM is memory into which you can both write data into memory and read data from memory. These features make RAM needed as a primary memory in a computer. Most RAM is volatile, which means that it requires a steady flow of electricity to maintain its contents. An interruption in power would thus lose data stored in RAM.

Computers also utilize some read only memory (ROM), which is used to store data that may be read only and does not allow data to be written. One type of ROM is electrically erasable programmable read only memory (EEPROM). This memory may be electronically erased. EEPROM comprises a large number of floating gates on which charge is stored to store data. Charge may be removed or added to these floating gates by specialized operations (i.e., erase or programming instructions).

One specific type of EEPROM is Flash memory, which is programmed and erased in blocks of data. A Flash memory generally includes a number of memory cells (e.g., a floating gate transistor for holding a charge) arranged in a memory array. The array groups memory cells into a block that can be programmed by charging the floating gate, or erased by changing the state of all the floating gate memory cells in the block in a single operation.

Commonly, Flash memories include registers to secure data. Protection registers are a limited size, special purpose non-volatile storage areas. Such protection registers are separate from the erase blocks noted above and are used for storage of device identifiers, security codes, erase block content date or other similar data. Once programmed, a programmer may lock the protection register by programming lock bits that, once set, may not be altered by the ultimate end user. The floating cells of the erase bits have no erase capability that can be accessed by the end user (factory-erasable), and once locked maintain their data in a fixed state.

Many protection registers are 128 bits, sufficiently long to allow the protection register to be used for storage of device identifiers, security codes or other data associated with the Flash memory device or the data contents of the erase blocks. A 128 bit protection register can be eight words divided into two 64-bit blocks, an A block and a B block. The A block is programmed by the manufacturer, and cannot be subsequently modified by the user. The user can program the B Block. The user can lock the B Block, preventing the data in this block from being subsequently modified.

In one product, an A Block is accessed at address 81-84h and Block B at address 85-88h. The A Block and B Block are accessed in the product ID mode. The status of the B Block can be determined at the address 80h. For the B Block, the lock status is stored in a fuse in the fuse array. Each fuse consists of three memory cells that are tied together. The use of three cells tied together is to enhance readability, since read failure/error cannot be tolerated because the lock status date relates to device configuration. Since the fuse is external to the protection register array, the fuse is read immediately upon device activation. All fuses are read and latched at power up. The lock status information is stored on its own dedicated lines. Thus when the command sequence for B Block program is entered, the command user interface (CUI) already knows the lock status of B Block and can start the program or not start the program algorithm as specified by the protection register information instructions.

However as Flash memory becomes ever larger and more complex, there is a need for additional protection registers. However, the inclusion of the additional protection registers introduce difficulties in determining the lock status of the protection registers in a group of protection registers—a protection register array.

Therefore, one advantage of the present invention is to provide a method for determining a lock status of the protection resisters in a protection register array in which the lock status may be determined even if the ordinary methods of determining lock status (as fuses) of the protection register are not practicable given the number of associated cells that would need to be modified exceed the system capability in certain circumstances.

SUMMARY OF THE INVENTION

One embodiment of the present invention includes a device and method in which a protection register array having a number of protection registers such that on-chip devices are able to determine a lock status without exceeding the capacity of these devices, (i.e., the lock PR is not implemented as a fuse any more but as part of the user-accessible array.) One-exemplary method determines the lock status in a protection register array in which the lock status is stored in a word in the protection register accessed at an access address. An initial verify function is used to determine the lock status of each protection register with one bit of the word determining the status of each register. The CUI does not know the lock status of the PR before hand so the algorithm always initiates. The reading of the lock status is now part of the algorithm instead of being read at power up. The fixed lock status address is forced read (only address entered by user is the PR address), the data are decoded, and the bits read at the address are applied to determine the lock status of each protection register. These data may then be applied to either allow the program algorithm to continue or to abort with a lock status fail. This solution may be used when the cells associated with the lock array is greater than a capacity of the on chip pumps (e.g., for this device 16 PR block>16×3 "fuse" cells=48 cells the pump was designed for max 18 cells).

BRIEF DESCRIPTION OF THE DRAWINGS

FIG. 1 is a block diagram of a protection register array including 16 protection registers.

FIG. 2 is a flow chart of an algorithm for reading a lock status in a protection register array in accord with the present invention.

DETAILED DESCRIPTION OF THE INVENTION

The use of additional protection registers allows added security functionality. However for additional protection registers, the prior methods of storing the lock status are not available. Thus a new method is needed. The new lock status word cannot be implemented as fuse cell as for OTP<1> since the word has to be user programmed (i.e., from an external source but must use on-chip pump. The on-chip pump can only program 18 cells).

In one embodiment (as in prior devices), a 128 bit, 16 word protection register, PR0, is incorporated. This register device includes an A block and a B block. The A block is programmed by the manufacturer of the chip, the B block is programmable by a programmer before shipping to an end user. The protection register array has been expanded to include an additional 16 protection registers, PR1-PR16 (shown in FIG. 1). Each protection register is a 128 bit register. Protection registers PR1-PR16 are programmable by a purchaser for both blocks. All of the blocks can be individually locked out to prevent further programming before shipping to an ultimate user. Once in product ID mode, PR1 is accessed at specific addresses, PR2 is accessed at another set of addresses, with each of the protection registers accessible in eight count address increments for each of the protection registers PR1-PR16.

The lock status of each protection register may be read from a single address, shown as A89 in FIG. 1. The lock status of each protection register is read at this address at the corresponding bit number shown as bits 0-15 of a 16 bit word read at address A89. For example, the zero bit of a word at address 89h stores the lock status of PR1, the bit one status stores the lock status of PR2, and so on until the final bit in the word indicating the lock status of PR16. This address can also be programmed to set the lock status, allowing both the read and the write of these registers by a programmer. A89 is also OTP only i.e., if any one bit is programmed to "lock", the status cannot be erased back to "unlocked".

As noted in the background of the invention section, the lock status of the protection register has in the past been stored in the fuse array. However, in the illustrated protection array, it is not practical to store the lock status in the fuse array. This is because the on-chip pumps are not able to handle the programming of 48 cells, the maximum that would need to be programmed in the lock status determination (3 cells for each of the 16 protection registers. So instead of placing the lock status word on the fuse array, the lock status word is placed on the protection register array.

However this placement results in the protection register data being unavailable at startup, since the protection register array is not read and stored at initial start up. The CUI has no way of knowing upon entering the command sequence for programming the protection registers PR1-PR16 if one of the specific protection registers is available for programming. For this reason the address for accessing the lock status of the protection registers has to be separately read and decoded before the program can begin.

A solution to this problem is described in the exemplary flow chart of FIG. 2. The Protection register algorithm includes an additional read step to determine lock status. When the command sequence to program protection registers PR1-PR16 is entered, the CUI automatically triggers this program algorithm without knowing the lock status.

At the start (block 20) before any program pulse is applied the algorithm first initiates a read of the PR array address in the protection array (block 22). The microprocessor forces the address at the PR array to the address location 89h, since this address will not be entered by the user. Initially, this address is checked to see whether it is protected (block 24). If it is protected, the algorithm will terminate with a lock fail (block 26). If not protected, the algorithm will use a verify function (block 28). [part of the default program algorithm.]

Since the microprocessor cannot control the read function, the verify function, with all attending verify signals, is used. To supply the read wordline voltage (rather than the other verify voltages which may include a tolerance margin) this read/verify is set as a first verify of the program. Next, the forced address is released, and the latched verify data are decoded. The PR address entered in the command sequence is matched to the corresponding bit in the data to determine the lock status of that specific protection register, as described in relation to FIG. 1 above at block 30 of FIG. 2. If the lock status is acceptable, the microprocessor would then continue (block 32) starting with the first verify of the PR address). If the lock status is not acceptable, the algorithm would abort (block 34) with lock fail status.

The seventeen (PR0-PR16) 128-bit registers can be used for security purposes in system design. The Protection Register Addressing, Table 1, shows an example of address locations within each protection register. The first protection register (PR0) is divided into two 64-bit blocks. The two blocks are designated as block A and block B. The data in block A are non-changeable and are programmed at the factory with a unique number. The data in block B are programmed by the user and can be locked out such that data in the block cannot be reprogrammed. The other 16 registers (PR1-PR16) have 128 bits (16 words) each that are all user programmable. To program block B in PR0 or to program registers PR1-PR16, a two-bus cycle command-must be used as shown in the Command Definition, Table 2. To lock out block B in register PR0 or to lock out registers PR1-PR16, a two-bus cycle command must also be used as shown in the Command Definition, Table 2. To lock out block B in PR0, the address used in the second bus cycle is 080h and data bit D1 must be zero during the second bus cycle. All other data bits during the second bus cycle are "don't cares." To lock out registers PR1-PR16, the address used in the second bus cycle is 089h and sixteen bits of data are programmed. If any of these bits is programmed to a zero, the appropriate register is locked. After being locked, the protection register cannot be unlocked. To determine whether block B in register PR0 or registers PR1-PR16 is locked out, the Product ID Entry command is given followed by a read operation from address 80 or address 89H, respectively. (This command is shown as status of protection in the Command Definition table.) For block Bi in register PR0, if data bit D1 is zero, block B is locked. If data bit D1 is one, block B can be reprogrammed. For registers PR1-PR16, sixteen bits of data are read out. Each bit represents the protection status of a particular register. If the bit is a zero, the register is locked. If the bit is a one, the register can be reprogrammed. To read a protection register, the Product ID Entry command is given followed by a normal read operation from an address within the protection register. After determining whether a register is protected for not or reading the protection register, the Read command must be given to return to the read mode.

What is claimed is:

1. An electronic device comprising:
a memory device having a memory array with memory cells grouped in erase blocks such that data in the memory cells can be erased on a block basis;
a protection register array in the memory device, the protection register array including:
a plurality of protection registers, each of the protection registers having a plurality of bit locations and an address in the memory device, a protection register being a storage area in the memory device that is separate from the erase blocks; and
a set of bit locations in the protection register array arranged to store a lock status word, the lock status word being a multiple bit word including an individual lock status for each of the protection registers, the set of bit locations accessible in the memory device at an access address, the access address being a single address for the lock status word, the access address of the lock status word being different from the address of each protection register; and
a circuit that stores and operatively accesses a lock status in the lock status word such that the circuit operatively determines a lock status of a specified protection register of the plurality of protection registers prior to applying a program pulse of a command sequence for operating on the protection register array, the command sequence including an address of the specified protection register of the plurality of programmable registers such that the circuit operatively matches the address of the specified protection register to a corresponding bit in the lock status word decoded from a verify function applied to read the lock status word at the single access address prior to applying the program pulse.

2. The electronic device of claim 1, wherein each protection register is a 128 bit register.

3. The electronic device of claim 1, wherein the protection register array includes a first protection register in addition to the plurality of protection registers, the first protection register having a factory programmed A block and a non-factory programmed B block, said A block and said B block are each 64 bit blocks.

4. The electronic device of claim 1, wherein the protection register array includes a first protection register in addition to the plurality of protection registers, the first protection register having a factory programmed A block and a non-factory programmed B block, Block B operable to being locked out by user programming.

5. The process of claim 1, wherein the circuit determines if the single access address is protected, the determination conducted prior to decoding the lock status word at the single access address.

6. A process comprising:
determining a lock status for a protection register in a protection register array in a memory device, the memory device having a memory array with memory cells grouped in erase blocks such that data in the memory cells can be erased on a block basis, a protection register being a storage area of the memory device that is separate from the erase blocks, the protection register array having a plurality of protection registers, the lock status being stored in a lock status word in the protection register array, the lock status word being a multiple bit word including an individual lock status for each of the protection registers, the lock status word being accessed at a single access address for the lock status word, the determination including:
prior to applying a program pulse of a command sequence for operating on the protection register array, the command sequence including an address of a specified protection register of the plurality of registers, initiating a read of the lock status word at the single access address first upon receiving the command sequence, the single access address being different from the address of the specified protection register in the command sequence;
reading the lock status word at the single access address with said read effected using an initial verify function providing the lock status word as latched data;
decoding the latched data from said verify function reading the lock status word at the single access address; and
matching the address of the specified protection register to a corresponding bit in said latched data to determine the lock status of the specified protection register.

7. The process of claim 6, further comprising a subsequent step of employing the lock status to either continue on to a program algorithm or abort with a lock status fail.

8. The process of claim 6, wherein the process includes determining the lock status of sixteen protection registers, each protection register having 128 bits.

9. The process of claim 8, wherein the process includes, after manufacture, programming one or more of the 128 bits.

10. The process of claim 6, wherein initiating the read of the lock status word at the single access address includes checking to determine whether the single access address is protected.

11. A process comprising:
determining a lock status of a protection register of a plurality of programmable protection registers in a protection register array in a memory device, the memory device having a memory array with memory cells grouped in erase blocks such that data in the memory cells can be erased on a block basis, a protection register being a storage area of the memory device that is separate from the erase blocks, the protection register array including a first protection register in addition to the plurality of programmable protection registers, the first protection register containing an A block and a B block, said A block programmed by a manufacturer, the lock status being stored in a lock status word in the protection register array, the lock status word being a multiple bit word including an individual lock status for each of the programmable protection registers, the lock status word being accessed at a single access address for the lock status word, the determination including:
prior to applying a program pulse of a command sequence for operating on the protection register array, the command sequence including an address of a specified protection register of the plurality of programmable protection registers, initiating a read of the lock status word at the single access address first upon receiving the command sequence, the single access address being different from the address of the specified protection register in the command sequence such that the single address is checked to determine whether it is protected;
if the single access address in not protected, reading the lock status word at the single access address with said read effected using an initial verify function providing the lock status word as latched data;

decoding the latched data from said verify function reading the lock status word at the single access address; and matching the address of the specified protection register to a corresponding bit in said latched data to determine the lock status of the specified protection register.

12. The process of claim 11, further comprising a subsequent step of employing the lock status to either continue on to a program algorithm or abort with a lock status fail.

13. The process of claim 11, wherein the process includes programming Block B using a fixed access address for Block B that is different from the single access address for the plurality of programmable registers of the protection register array.

14. The process of claim 11, wherein the process includes determining the lock status of sixteen protection registers, each protection register having 128 bits.

15. The process of claim 14, wherein the process includes, after manufacture, programming one or more of the 128 bits.

* * * * *